Patented Dec. 23, 1947

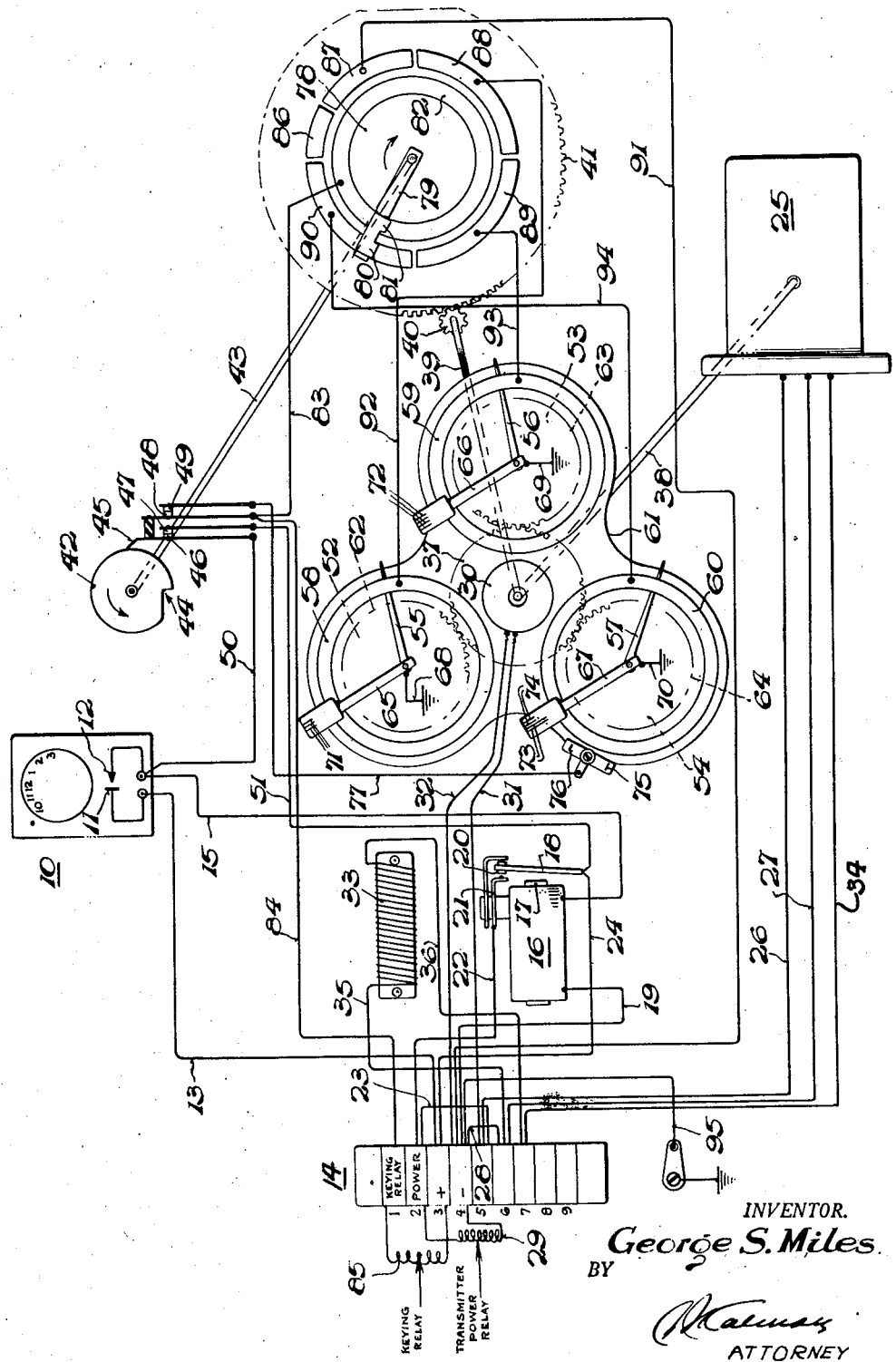

2,433,288

UNITED STATES PATENT OFFICE 2,433,288

WEATHER STATION

George S. Miles, West Englewood, N. J., assignor to Bendix Aviation Corporation, Teterboro, N. J., a corporation of Delaware Application May 4, 1944, Serial No. 534,119

7 Claims. (Cl. 177—380)

1

The present invention relates to automatic weather stations adapted for use in automatically transmitting at timed intervals to any desired point information regarding various atmospheric conditions occurring at a selected station and more particularly to meteorological transmitters therefor.

Known automatic weather stations have been large and cumbersome and required permanent sheltering sheds, etc., in order to protect the power plant needed for the operation thereof. Where the station is intended for permanent installation no problem is presented by the use of known apparatus. However, under certain conditions, the use of a weather station, portable in character, is desirable so that it may be transported readily by an individual from place to place and left at will in any selected area to be unattended for relatively long periods of time. Obviously, the lack of portability made known stations inappropriate for this latter use and the present invention contemplates the provision of a novel and simplified weather station which may be carried readily from place to place by an individual and set up in any pre-selected area to be left unattended for relatively long periods of time.

An object of the present invention is to provide a novel automatic weather station which is simple in design, light in weight and possesses a minimum number of parts.

Another object of the invention is to provide a novel and simplified transmitter for a weather station adapted for transmitting information from any desired point by radio telegraph signals spaced at such time intervals as will allow the receiving operator to measure the time intervals by means of a simple stop watch, for example.

A further object is to provide a novel and simplified chronometric weather station adapted for transmitting by radio from a pre-selected area information relating to various atmospheric functions such as, for example, pressure, temperature and humidity.

The above and further objects and novel features of the invention will more fully appear from the following detailed description when the same is read in connection with the accompanying drawing. It is to be expressly understood, however, that the drawing is for the purpose of illustration only and is not intended as a definition of the limits of the invention.

The single figure of the drawing is a schematic representation of the novel meteorological transmitter of the present invention.

2

The novel meteorological transmitter of the present invention is shown as adapted for transmitting the value of three weather functions, i. e., pressure, temperature and humidity. It is to be specifically understood, however, that the invention may be applied equally as well to the transmission of a number of functions greater than or less than that specified as may be desired. Generally considered, each condition responsive instrument is provided with an angularly movable contact needle positioned by the operating mechanism of the instrument, all of the contact needles being locked in place upon the occurrence of a predetermined time interval. A sufficient period of time is allowed for warming up the radio transmitter during which time no signal is transmitted. A second timed interval is provided during which a continuous station identifying signal is transmitted followed by a reference signal and, thereafter, the reading of each instrument is transmitted in a timed sequence.

Referring now to the single figure of the drawing for a more detailed description of the present invention, a clock 10, of conventional construction, is there shown having normally open contacts 11 and 12. The clock is of the type wherein upon the occurrence of a given time interval the contacts are automatically closed. The clock, per se, constitutes no part of the present invention and is therefore shown schematically only.

Contact 11 is connected by means of a lead 13 with a section 3 of a master switchboard 14, the section being connected with one side, such as the positive side, of a suitable battery (not shown), while contact 12 connects with a section 4 of the switchboard, representing the negative side of the battery, by way of a lead 15, a power relay 16 having a movable core 17 and a pivotally mounted armature 18 associated therewith, and a lead 19. When contacts 11 and 12 are closed by the clock, therefore, power relay 16 becomes energized whereby its armature is swung to the left to cause engagement between a contact 20 carried by the armature and a conductor strip 21, the latter being connected by a lead 22 with a section 2 of the switchboard which, in turn, is connected with a section 5 by way of a tie lead 23, the opposite end of the armature being connected by way of a lead 24 with section 3 or the positive side of the battery.

Engagement between armature contact 20 and strip 21 closes the circuit across a driving motor 25, the circuit of which may be traced as follows. Current will flow from section 3 through lead 24, armature contact 20, strip 21, lead 22 to section 2, through tie lead 23 to section 5 and from that section through a lead 26 to the motor and back from the motor through a lead 27 to section 6 which connects with section 4, or the negative side of the battery, through a tie lead 28. At the same time, a transmitter power relay 29, of a conventional radio transmitter (not shown), connected across sections 2 and 4 is energized as well as a solenoid 30 which connects by means of a lead 31 with section 5 and tie lead 23 to the positive side of the battery and with the negative side of the battery through a lead 32, all for a purpose to presently appear.

A novel resistor 33 is interposed between lead 27 of the motor and a motor lead 34 by means of leads 35 and 36 which are connected to sections 6 and 7, respectively, of the switchboard. The resistor is designed to have a high temperature coefficient so as to compensate for extremely low ambient temperatures affecting the motor shunt winding to thereby maintain the motor speed substantially constant as more fully shown and described in my copending application Serial No. 533,897, filed May 3, 1944.

Upon energization, motor 25 drives a gear 37 through a drive shaft 38, the gear in turn driving a shaft 39 which carries a pinion 40 for meshing with a relatively large gear 41. Gear 41, on the other hand, drives a cam 42 through a suitable connection 43. The cam is provided with a cut-away portion 44 which is initially engaged by a spring element 45 just prior to a starting operation of the system. When spring element 45 is in engagement with the cut-away portion of the cam, pairs of contacts 46—47 and 48—49 are open. Contact 46, carried by element 45, is connected by means of a lead 50 with lead 15, power relay 16, lead 19 and section 4 of the switchboard. Contact 47, on the other hand, connects by way of a lead 51 with lead 24 and section 3 of the board. After a predetermined time interval spring element 45 will pass from portion 44 of the cam to the outer periphery thereof at which time contacts 46—47 become closed, the purpose of these contacts being that even though clock contacts 11 and 12 open, contacts 46—47 will assume primary control of the circuit to maintain it closed to motor 25, transmitter power relay 29 and solenoid 30.

Three condition responsive instruments 52, 53 and 54, of conventional form, are shown in the present instance which measure desired atmospheric conditions such as pressure, humidity and temperature, each of the instruments supporting on their actuating shafts needles 55, 56 and 57 which are positioned in accordance with the condition being measured and whose outer ends are bent upwardly 90° for a purpose to presently appear. Superimposed over each instrument is an annular conductor ring 58, 59 and 60, each of which is supported by a longitudinally movable plate 61 which, in response to energization of solenoid 30 is forced downwardly to urge rings 58—59 and 60 against needles 55, 56 and 57 to hold the latter in a locked position.

Meshing with gear 37 are three gears 62, 63 and 64, each of which is superimposed over plate 61 and arranged coaxially with its respective condition responsive instrument. Gears 62, 63 and 64 are provided with scanning arms 65, 66 and 67 secured thereto for movement therewith, the outer end of each scanning arm being provided with conductor strips for engagement with the bent ends of needles 55, 56 and 57, the strips of each arm being grounded by their associated conducctors 68, 69 and 70.

The conductor strips may be varied in number on each arm to thereby provide a recognizable code identifying the particular instrument whose reading is being transmitted at any particular time. For example, arm 65 is provided with three such strips 71 so that when arm 65 engages needle 55 three signals will be transmitted by the transmitter. Arm 66 is provided with four strips 72 so that four signals will be transmitted when arm 66 engages needle 56 while arm 67 is provided with two pairs of strips 73 and 74, one pair being composed of relatively short strips and the other pair of relatively long strips, all four strips being adapted for engagement with contact needle 57 while the two long strips are adapted for engagement only with two separated upright reference contacts 75 and 76 carried by instrument 54 and connected by way of lead 77 with contact 49 of cam operated contacts 48—49.

In addition to driving the relatively large gear 41, motor 25 also drives an annular member 78 which is suitably fastened to gear 41 and supports thereon a wiper arm 79 having two contacts 80 and 81 thereon, contact 81 being at all times in engagement with an annular conductor segment 82 which is connected by way of leads 83 and 84 with section 1 of the switchboard to control the operation of a keying relay designated generally as a coil 85. Coil 85 is placed across sections 1 and 3 of the switchboard and is arranged within a conventional radio transmitter (not shown) whereby a signal is transmitted for each energization of the keying relay.

Contact 80 of the wiper arm, on the other hand, is adapted for engagement with separated arcuate conductor segments 86, 87, 88, 89 and 90. These segments are connected with the rest of the system as follows: Segment 86 is a blank whereby a predetermined warm-up period is provided for the transmitter prior to the sending of any signal. Segment 87 is connected to section 4 of the switchboard, or the negative side of the battery, by way of a lead 91 and defines a timed circuit for transmitting a continuous signal from the transmitter. Segments 88, 89 and 90 define circuits for transmitting the readings of the three instruments shown and segment 88 is connected to annular conductor ring 58 of instrument 52 by means of a lead 92, segment 89 is connected to annular conductor ring 59 of instrument 53 by way of a lead 93 and segment 90 connects by way of a lead 94 with annular conductor ring 60 of instrument 54.

The foregoing description has been limited principally to the actual co-relation of the mechanical parts of the novel meteorological transmitter of the present invention as well as the electrical connections defining the various electrical circuits thereof. The transmitter and its function will be understood more readily by the following consideration of the operation of the entire system.

Just prior to the initiation of a transmission cycle, contact 80 of wiper arm 79 will be contacting blank segment 86 at the outermost end thereof and spring element 45 will be resting in cutaway portion 44 of cam 42 so that both pairs of contacts 46, 47 and 48, 49 will be open. When the period for operation has arrived, clock 10 closes contacts 11 and 12 so that power relay 16 becomes energized and closes the circuit through power relay 29 of the radio transmitter and energizes both solenoid 30 and driving motor 25.

Solenoid 30 forces plate 61 downwardly whereby annular conductor rings 58, 59 and 60 are pressed against needles 55, 56 and 57 holding the needles locked for the remainder of the transmission cycle in the indicating position last assumed by the needles just prior to the operation of the solenoid.

Simultaneously with the energization of solenoid 30, motor 25 drives gear 37 whereby scanning arms 65, 66 and 67 are rotated relative to their respective instruments, wiper arm contact 80 is caused to move relative to and in engagement with blank segment 86, and cam 42 is rotated with spring element 45 in engagement with portion 44 thereof. At this point, even though strips 73 of scanning arm 67 engage with upright contacts 75 and 76 the keying relay is left in open circuit position by virtue of the fact that contacts 48—49 remain open. The latter contacts thus constitute a precautionary feature preventing any signal transmission until the transmitter has been warmed up sufficiently.

Subsequently, motor 25 drives cam 42 until spring element 45 engages with the outer periphery thereof whereupon contacts 46—47 and 48—49 are closed. Even though clock contacts 11 and 12 remain closed for a given interval of time, contacts 46—47 assume primary control of the system and maintain relay 16, transmitter power relay 29, motor 25 and solenoid 30 energized notwithstanding that eventually the clock contacts will open. Contacts 48—49, on the other hand, when in engagement, place keying relay coil 85 in closed circuit with the rest of the system. The system is thus ready for the transmission of signals.

With the closing of contacts 46—47 and 48—49 by cam 42, motor 25 drives wiper arm 79 from blank segment 86 onto segment 87. By engagement of wiper arm contact 80 with segment 87 the keying relay is energized whereby the transmitter sends out a continuous signal permitting a receiving operator to tune his receiver to the frequency of the incoming signal. The signal is transmitted until wiper arm 79 passes segment 87 to approach segment 88. The circuit to the keying relay for providing the continuous signal is defined by lead 91 from section 4 of the switchboard, through segment 87, wiper contacts 80, 81, segment 82, lead 83 and lead 84.

At the point where arm 79 has left segment 87 and is about to engage with segment 88, scanning arm 67 of instrument 54 will have been driven to a point intermediate upright contacts 75 and 76. Thereafter upright contact 76 will be engaged by both strips 73 to energize the keying relay twice to transmit two signals. The two signals thus transmitted, are reference signals at which time the receiving operator is advised that the desired information is about to be transmitted and sets his stopwatch upon the receipt of the two signals. The circuit for the transmission of the reference signals is defined from ground, through lead 70, scanning arm 67, conductor strips 73, upright contact 76, lead 77, contacts 48—49, lead 84, keying relay coil 85 and to the positive side of the battery defined by section 3 of the switchboard.

All of the scanning arms 65, 66 and 67 have been carefully set at the zero indication of their respective instruments so that the reference signals transmitted upon engagement of scanning arm 67 with upright contact 76 will constitute a reference for each instrument. This is brought about by the fact that all three scanning arms are operated from common gear 37. As scanning arm 67 leaves contact 76 and even though wiper arm 79 has moved into engagement with segment 88, the keying relay will remain de-energized. Segment 88 being electrically connected with conductor ring 58 of instrument 52, the keying relay will again become energized when scanning arm 65 brushes over needle 55. Such energization of the keying relay will manifest itself in the transmission of three signals, one signal for each conductor strip 71 on scanning arm 65. The time interval between the reception of the first two reference signals and the three signals resulting from engagement of the three strips 71 with needle 55 is noted by the receiving operator.

The circuit for the transmission of the last named signals representing the reading of instrument 52 is defined from ground, through lead 68, scanning arm 65, conductor strips 71, needle 55, conductor ring 58, lead 92, segment 88, wiper arm contacts 80, 81, segment 82, leads 83 and 84, keying relay coil 85 and to the positive side of the battery defined by section 3 of the switchboard.

The keying relay is again de-energized when the last strip 71 of arm 65 passes over needle 55. The three scanning arms continue rotation until scanning arm 67 together with its conductor strips 73 brushes over upright contact 75 whereupon the keying relay is again energized to transmit two reference signals advising the receiving operator to note the reception time. The time interval between the reception of the two reference signals resulting from the engagement of strips 73 with upright contact 76, the three signals resulting from the engagement of conductor strips 71 with needle 55 of instrument 52, and the two following reference signals resulting from the engagement of strips 73 with upright contact 75, provide the receiving operator with sufficient information to determine the reading of instrument 52.

Simultaneously with the rotation of the scanning arms, wiper arm 79 leaves segment 88 to engage segment 89 thereby temporarily isolating instruments 52 and 54 from the circuit and placing instrument 53 into circuit with the keying relay. Just prior to the time that wiper arm 79 engages with segment 89, scanning arm 67 will again have assumed a position intermediate upright contacts 75 and 76 and shortly thereafter engage contact 76 to again transmit two reference signals which are again noted and timed by the receiving operator. Following this operation, segment 89 is engaged by wiper arm 79. The keying relay is energized as conductor strips 72 brush over needle 56 of instrument 53, four such signals being transmitted by the keying relay by virtue of the four conductor strips carried by arm 66. The circuit to the keying relay is generally the same as that for instrument 52 except that the circuit is from ground, through lead 69, scanning arm 66, conductor strips 72, needle 56 and conductor ring 59 to segment 89.

The keying relay is de-energized when the last of strips 72 passes over needle 56 and thereafter strips 73 of scanning arm 67 engages upright contact 75 to transmit two reference signals. The time interval between the first two reference signals generated by the engagement of scanning arm strips 73 with upright contact 76, the four signals resulting from the engagement of contact strips 72 with needle 56 of instrument 53 and the two reference signals resulting from the engagement of strips 73 with upright contact 75 informs the receiving operator of the reading of instrument 53.

Scanning arm 67 is again driven over contact 76 until strips 73 engage therewith whereupon the keying relay is again energized to send out two signals advising the operator to re-set his stopwatch for the reading of instrument 54. At the same time wiper arm 79 and its contacts 80, 81 have left segment 89 to engage with segment 90 whereby upon the engagement of both pairs of conductor strips 73 and 74 with needle 57, the keying relay will become energized to send out four signals, one for each strip of pairs 73 and 74. Thereafter scanning arm 67 brushes over upright contact 75 and as conductor strips 73 engage therewith two more reference signals are generated. The time interval between the first two reference signals, the four signals resulting from the engagement of all four strips of scanning arm 67 with needle 57, and the last two reference signals provides the receiving operator with sufficient information for determining the reading of instrument 54. The transmission circuit for the signals of instrument 54 is defined from ground, through lead 70, scanning arm 67, conductor strips 74, needle 57, lead 94 and segment 90 to the keying relay by virtue of wiper arm contacts 80, 81, ring 82, and leads 83, and 84.

Following the transmission of the signals representing the reading of instrument 54, cam 42 will have been driven to the point where spring element 45 falls from the outer periphery of the cam into the cut-away portion 44 thereof whereupon contacts 46—47 and 48—49 become open de-energizing the complete apparatus which is now ready for another transmission cycle depending upon the time that clock contacts 11 and 12 have been set for operation.

There has thus been provided a novel, simple and reliable meteorological transmitter which is timed for energization at certain predetermined intervals, the operation thereof consisting of certain timed steps comprising a warm up interval for the radio transmitter, a period at which a continuous signal is transmitted by the radio transmitter, followed by a reading reference signal and thereafter by a signal representing the reading of the first instrument, the reference signal being repeated preceding and following each transmission of the reading of the remaining instruments.

Although but a single embodiment of the present invention has been illustrated and described in detail, it is to be expressly understood that the invention is not limited thereto. For example, scanning arm 65 has been shown with three conductor strips, arm 66 with four conductor strips and arm 67 with four conductor strips but any other desired grouping of the strips may be provided equally as well. Various other changes may be made in the design and arrangement of the parts without departing from the spirit and scope of the invention, as will now be understood by those skilled in the art. For a definition of the limits of the invention, reference will be had primarily to the appended claims.

I claim:

1. A meteorological transmitter comprising an electrical transmission circuit, a circuit controlling instrument responsive to a change in an atmospheric condition and having an angularly movable contact positioned in accordance with the change in such condition, reciprocally mounted means arranged over said instrument for holding said contact in the position assumed prior to the operation of said reciprocally mounted means, a reference signal contact, cam operated means for connecting said reference signal contact with said circuit, an angularly movable contact arm arranged coaxially with said instrument contact having a plurality of relatively long and spaced contacts for cooperation with said reference signal contact and having a plurality of relatively short and spaced contacts for cooperation with said instrument contact, selective means for providing in sequence a warm up interval for said circuit, an interval of constant circuit energization whereby a continuous signal is transmitted thereby, and for thereafter connecting said instrument with said circuit for energization in accordance with the position of said instrument contact when engaged by said movable contact arm, a motor for operating said selective means, said cam operated means and said movable contact arm whereby said selective means warms up said circuit and thereafter energizes said circuit to transmit a continuous station signal, and said cam operated means connects said reference signal contact with said circuit whereby upon engagement of the long contacts of said movable contact arm with said reference signal contact said circuit transmits reference signals, and thereafter the long and short contacts of said contact arm engage said instrument contact to energize said circuit in accordance with the position of said instrument contact, and control means for operating said motor and said reciprocally mounted means.

2. A meteorological transmitter comprising an electrical transmission circuit, a plurality of circuit controlling instruments each being responsive to changes in an atmospheric condition, an angularly movable contact for each of said instruments positioned in accordance with changes in the conditions being measured, locking means comprising a reciprocally mounted member superimposed over said instruments for holding said contacts in the position assumed prior to the operation of said locking means, a solenoid for operating said locking means, a reference signal contact, cam operated means for connecting said reference signal contact with said circuit, angularly movable contact arms for cooperation with each of said instrument contacts, one of said arms being adapted for cooperation with said reference signal contact, gears for operating each of said contact arms, a common driving gear for said contact arm gears, selective means for providing a warm up interval for said circuit, an interval of continuous circuit energization whereby a continuous signal is transmitted thereby, and for thereafter sequentially connecting said instruments with said circuit for sequential energization of said circuit in accordance with the position of said instrument contacts when engaged by their respective movable contact arms, driving means for operating said selective means, said cam operated means and said common driving gear whereby said selective means warms up said circuit and thereafter energizes said circuit to transmit a continuous station signal, and said cam operated means connects said reference signal contact with said circuit whereby upon engagement of said one movable contact arm with said reference signal contact said circuit transmits a reference signal, and thereafter said circuit is sequentially energized by said selective means as each instrument contact is engaged by its respective movable contact arm, and a time controlled device for operating said driving means and for energizing said solenoid.

3. A meteorological transmitter comprising an electrical transmission circuit, a plurality of circuit controlling instruments each being responsive to changes in an atmospheric condition, an angularly movable contact for each of said instruments positioned in accordance with changes in the conditions being measured, reference signal means, cam operated means for connecting said reference signal means with said circuit, angularly movable contact arms arranged coaxially with each of said contacts for cooperation therewith, one of said arms also being adapted for cooperation with said reference signal means, selective means for providing a warm up interval for said circuit, an interval of continuous circuit energization whereby a continuous signal is transmitted thereby, and for thereafter connecting said instruments with said circuit for sequentially energizing said circuit in accordance with the position of said instrument contacts when engaged by their respective movable contact arms, driving means for operating said selective means, said cam operated means and said movable contact arms whereby said selective means warms up said transmission circuit and thereafter energizes it to transmit a continuous station signal, and said cam operated means connects said reference signal means with said circuit whereby upon engagement of said one movable contact arm with said reference signal means said circuit transmits a reference signal, and thereafter said circuit is sequentially energized by said selective means as each instrument contact is engaged by its respective movable contact arm, and means for operating said driving means.

4. A meteorological transmitter comprising an electrical transmission circuit, clock controlled means for energizing said circuit, a circuit controlling instrument responsive to a change in an atmospheric condition being measured, means for connecting said instrument with said circuit to energize said circuit to thereby transmit a signal corresponding to the value of the condition measured by said instrument, reference signal means for energizing said circuit to transmit a reference signal thereby, a motor initially energized by said clock controlled means for operating said reference signal means and said connecting means, and cam operated means connected in said circuit and driven by said motor for overpowering the control effected on said motor by said clock controlled means and for assuming primary energization of said motor and for connecting said reference signal means with said circuit.

5. A meteorological transmitter comprising an electrical transmission circuit, clock controlled means for energizing said circuit, a plurality of circuit controlling instruments each being responsive to changes in an atmospheric condition, means connected with each of said instruments for energizing said circuit to transmit signals corresponding to the value of the conditions measured by each of said instruments, reference signal means for energizing said circuit to transmit a reference signal preceding the energization of said circuit by each of said instrument means, selective means for sequentially connecting said instrument means with said circuit, driving means initially energized by said clock controlled means for operating said reference signal means and said selective means and means comprising cam operated contacts connected in said circuit and operated by said driving means for overpowering the control effected on said driving means by said clock controlled means and for assuming primary energization of said driving means and for connecting said reference signal means with said circuit.

6. A meteorological transmitter comprising an electrical transmission circuit, a circuit controlling instrument responsive to a change in an atmospheric condition and having an angularly movable contact positioned in accordance with the change in such condition, a reference signal contact, cam operated means for connecting said reference signal contact with said circuit, an angularly movable arm arranged coaxially with said instrument contact having at least one relatively long contact and one relatively short contact thereon, said arm contacts being arranged whereby said long contact is adapted for engagement with said reference signal contact only and both said long and short contacts are adapted for engagement with said instrument contact, selective means for providing in sequence a warm up interval for said circuit, an interval of constant circuit energization whereby a continuous signal is transmitted thereby, and for thereafter connecting said instrument with said circuit for energization in accordance with the position of said instrument contact when engaged by said movable contact arm, said selective means comprising an annular contact and spaced arcuate contacts together with a sweep arm for contacting said annular contact and said arcuate contacts, and a motor for driving said sweep arm, said cam operated means and said movable contact arm.

7. A meteorological transmitter comprising an electrical transmission circuit, a plurality of circuit controlling instruments each being responsive to changes in an atmospheric condition, an angularly movable contact for each of said instruments positioned in accordance with changes in the conditions being measured, a reference signal contact, cam operated means for connecting said reference signal contact with said circuit, angularly movable contact arms for cooperation with each of said instrument contacts, one of said arms being adapted for cooperation with said reference signal contact, selective means comprising an endless annular contact, a plurality of spaced arcuate contacts coaxial with said annular contact, one of said arcuate contacts when engaged providing a warm up interval for said circuit, a second of said arcuate contacts when engaged providing a continuous transmission signal for said circuit, and the remainder of said arcuate contacts being each connected to each of said instruments so that as the latter contacts are engaged the circuit is energized in accordance with the position of the related instrument contacts when the latter are engaged by their respective movable contact arms, a wiper arm provided with a pair of contacts for engaging said annular contact and sequentially said arcuate contacts, driving means for operating said wiper arm, said cam operated means and said movable contact arms whereby said first arcuate contact is engaged by said wiper arm to warm up said circuit, said second arcuate contact is engaged by said wiper arm to energize said circuit to transmit a continuous station signal, and said cam operated means connects said reference signal contact with said circuit whereby upon engagement of said one movable contact arm with said reference signal contact said circuit transmits a reference signal, and thereafter said circuit is sequentially energized as said wiper arm progressively engages the remainder of said arcuate contacts and as each instrument contact is engaged by its respective movable contact arm, and a time controlled device for operating said driving means.

GEORGE S. MILES.

REFERENCES CITED

The following references are of record in the file of this patent:

UNITED STATES PATENTS

| Number | Name | Date |
|---|---|---|
| 1,913,511 | Reynolds | June 13, 1933 |
| 2,140,380 | Gawehn | Dec. 13, 1938 |
| 2,207,769 | White | July 16, 1940 |
| 2,216,161 | Curtiss et al. | Oct. 1, 1940 |
| 2,287,786 | Diamond | June 30, 1942 |
| 2,347,160 | Wallace | Apr. 18, 1944 |